United States Patent
Bunker et al.

(10) Patent No.: US 7,627,866 B2
(45) Date of Patent: Dec. 1, 2009

(54) SYSTEMS AND METHODS FOR DYNAMIC APPLICATION PATCHING

(75) Inventors: Ross T. Bunker, Seattle, WA (US); Roger B. Weber, Lynnwood, WA (US); Lawrence A. Jones, Snoqualmie, WA (US)

(73) Assignee: Bea Systems, Inc., San Jose, CA (US)

( * ) Notice: Subject to any disclaimer, the term of this patent is extended or adjusted under 35 U.S.C. 154(b) by 428 days.

(21) Appl. No.: 11/012,767

(22) Filed: Dec. 15, 2004

(65) Prior Publication Data
US 2006/0294430 A1 Dec. 28, 2006

(51) Int. Cl.
*G06F 9/44* (2006.01)
(52) U.S. Cl. .................. 717/168; 717/166
(58) Field of Classification Search .......... 717/121, 717/166, 168
See application file for complete search history.

(56) References Cited

U.S. PATENT DOCUMENTS

| | | | | |
|---|---|---|---|---|
| 6,327,594 B1 | 12/2001 | Van Huben et al. | ......... | 707/200 |
| 6,360,363 B1 | 3/2002 | Moser et al. | ............... | 717/170 |
| 6,754,659 B2 | 6/2004 | Sarkar et al. | ................... | 707/10 |
| 6,857,012 B2 | 2/2005 | Sim et al. | ................... | 709/222 |
| 7,047,448 B2 * | 5/2006 | Rao et al. | ................... | 717/124 |
| 7,047,522 B1 | 5/2006 | Dixon et al. | .................. | 717/131 |
| 7,127,712 B1 * | 10/2006 | Noble et al. | .................. | 717/173 |
| 2002/0188935 A1 * | 12/2002 | Hertling et al. | ............ | 717/170 |
| 2003/0167455 A1 | 9/2003 | Iborra et al. | | |
| 2004/0024812 A1 | 2/2004 | Park et al. | | |
| 2005/0060698 A1 * | 3/2005 | Boykin et al. | ............... | 717/166 |
| 2005/0154699 A1 * | 7/2005 | Lipkin et al. | .................. | 707/1 |
| 2006/0059156 A1 * | 3/2006 | Janes et al. | .................... | 707/9 |
| 2007/0226726 A1 * | 9/2007 | Robsahm | .................... | 717/168 |

OTHER PUBLICATIONS

Daniel H. Steinberg, "A Java IDE written entirely in Java," 1997, JavaWorld.com [online], accessed Feb. 27, 2009, Retrieved from Internet <URL: http://www.javaworld.com/javaworld/jw-12-1997/jw-12-roaster.html>, 3 pages.*

* cited by examiner

*Primary Examiner*—Eric B Kiss
(74) *Attorney, Agent, or Firm*—Squire, Sanders & Dempsey L.L.P.

(57) ABSTRACT

A system and method to update a patch index such that one or more properties in the patch index are associated with the patch, wherein the patch includes one or more components for the target software system; updating a class path at runtime for the target software system such that the patch associated with each one of the one or more properties supersedes prior patches for the same property; and wherein a component can include a class.

15 Claims, 3 Drawing Sheets

SYSTEMS AND METHODS FOR DYNAMIC APPLICATION PATCHING

FIELD OF THE DISCLOSURE

The present disclosure relates generally to software deployment tools and, more particularly, to techniques for dynamically patching applications.

BACKGROUND

Maintenance releases of software shipped independently of the normal software release cycle are commonplace. Patches are deployed onto existing software installations (targets) to fix critical software problems (e.g., bugs) without the need to re-release an entire software package. Service packs are frequently used to combine a number of fixes and deploy them together. Deploying, installing, and uninstalling a patch or service pack, hereafter collectively referred to as a patch, present a number of problems which must be solved to ensure that a patch is installed correctly, maintains system consistency and integrity, functions properly, and can be uninstalled without side effects.

Properly installing a patch to a target can be complicated and require intricate working knowledge of the structure of the software being updated. A patch can be given an identifier and can include one or more of the following components: executable code, source code, libraries, configuration information, deployment information, artifacts, resources, audio/visual presentations, controls, data files, and other suitable components. Commonly available tools such as WinZip® (a registered trademark of WinZip Computing, Inc.) can be used to extract a patch's components on a target's computer system. Such tools can even build a hierarchical directory structure for the files as part of the extraction process.

Additional steps are still required to ensure that components added by the patch are placed in their proper location in the system, that modified components are replaced, and that deleted components are removed. These steps may be performed manually by a system administrator. However, most system administrators lack the requisite knowledge of a target's software architecture to manually perform these steps. More commonly, a patch installer process (e.g., an installation script) is included with the patch to perform the additional steps necessary to correctly install the patch. But creating patch installers consumes valuable development time which could be better focused on creating and maintaining the software itself.

The use of shared code can also complicate the process of correctly patching a target software system. Controls, libraries, and other shared code are utilized to perform common tasks across pieces of a target and to reduce development and testing time. Installing a patch for shared code intended to solve a problem in one target piece but may cause a different problem for another piece using the same shared code. Therefore it is important that patches be installed on the system so that only the intended target pieces utilize them. Installing a new version of the target system onto an existing, previously patched installation can also result in confusion and the improper operation of the system. There is risk that an older version of shared components may be used instead of the updated components.

Although patches are intended to solve customer problems or provide new functionality, in some cases a patch may contain side effects or bugs which result in unintended behaviors. When this occurs, the patch may have to be removed from the system. The process of removing a patch may be complicated by the number of components included in the patch, the number of target pieces which use the patch components and whether additional patches have been installed subsequent to the patch to be removed. The process removing the patch must ensure that each component included in the patch is replaced with the appropriate prior version of the component. This generally requires an administrator or a process to first remove all patches installed subsequent to the patch being removed in the reverse order in which they were installed. Once the subsequent patches have been removed, the patch can be removed and the subsequent patches reinstalled to return the system to the desired state. However, this is a cumbersome and time consuming procedure that is naturally prone to error due to the number of steps involved.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to one skilled in the art that the invention may be practiced without these specific details. In other instances, well-known features have not been described in detail so as not to obscure the invention.

Figure 1:
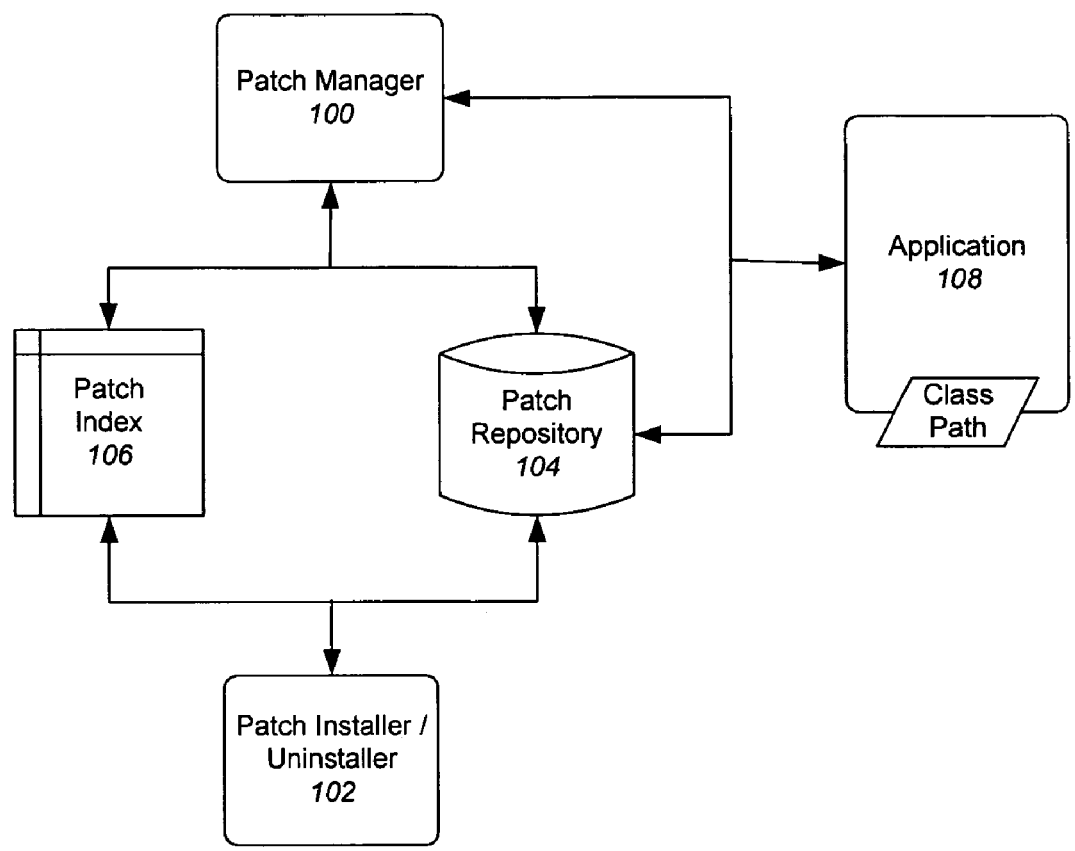
FIG. 1 is an illustration of a system in accordance to certain embodiments of the invention.

FIG. 1 is an illustration of a system in accordance to certain embodiments of the invention. Although this diagram depicts elements as logically separate, such depiction is merely for illustrative purposes. It will be apparent to those skilled in the art that the elements portrayed in this figure can be combined or divided into separate software, firmware and/or hardware elements. Furthermore, it will also be apparent to those skilled in the art that such elements, regardless of how they are combined or divided, can execute on the same computing device or can be distributed among different computing devices connected by one or more networks or other suitable communication means.

When a patch is installed, the patch components can be stored on a target system patch repository 104. By way of illustration, a patch repository can utilize, but is not limited to, any type of persistent storage such as a database, a file, a file system, a distributed object, and any other suitable physical or logical storage means. In one embodiment, the patch repository can contain all the components for all installed patches. In another embodiment, separate patch repositories may exist for each version of a target software system. Separating patches according to target software versions allows patches to be centrally located and avoids conflicts which may result between the patches and different versions of a software system.

In various embodiments, a patch repository has an associated patch index 106 (which may or may not be stored in the repository itself). The patch index contains information regarding patches in the patch repository. In one embodiment, the patch index includes the locations of a given patch's components in the patch repository. The patch index can also maintain the relative order of all patches which were installed. The patch index can also keep track of which patch components (or patches) apply to which piece of the target. When patches are installed, the patch index can be updated to include the new locations of the components installed by the patch. The patch index can be used to ensure that the software system remains consistent in light of the addition and removal of patches.

In one embodiment, the patch index can include a set of properties for each target. By way of illustration, the patch index can be a Java® properties file. (Java® is a registered trademark of Sun Microsystems, Inc.) A property can pertain to any piece of a target software system. By way of illustration, each property can correspond to a piece of an Integrated Development Environment (IDE), such as an IDE runtime, application design tool, compiler, editor, optimizer, etc. In aspects of this embodiment, each property in the patch index can be accompanied by an ordered, semi-colon separated list of one or more patches. The following is an exemplary portion of a patch index file:

system_patches=patches_812/CR15923.jar;patches_812/CR23432.jar extension_patches=patches_812/CR52334.jar In one embodiment, a patch for the IDE includes a Java® Archive (JAR) file which includes any new and modified components to be used by the IDE. The JAR file bundles all the patch's components into a single file. The JAR file can have a unique name that corresponds to a patch identifier. In this example, there are two properties: system_patches and extension_patches. The system_patches property as an ordered list of two patch files. The patch file named patches_812/CR15923.jar was installed after patches_812/CR23432.jar. The property extension_patches has one patch, patches_812/CR52334.jar.

The patch index may be accessed through a patch manager 100, which provides a logical interface to the patch index. The patch manager allows a process to obtain patches for a given property. The patch manager can access the patch index and return the list of patched properties to the calling process which can then use the list to access the patches for the properties. By way of illustration, the patch manager can be utilized by an IDE to patch itself dynamically while maintaining a consistent, fully operational software system. In one embodiment, given a property, the patch manager can return the list of patches for that property to the calling process.

Figure 2:
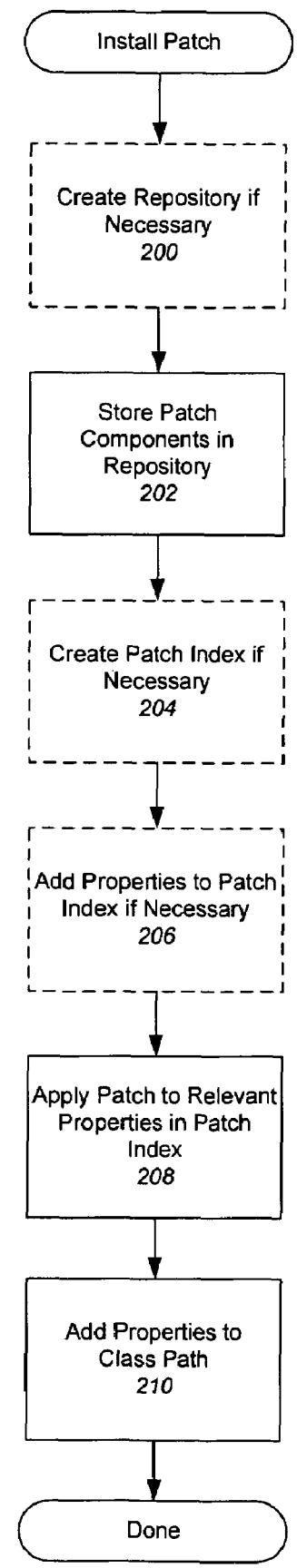
FIG. 2 is a flow chart illustrating a patch installation process in accordance to certain embodiments of the invention.

FIG. 2 is a flow chart patch installation in accordance to certain embodiments of the invention. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

In various embodiments, patch installer 102 installs a patch according to the following process. In step 200, a patch repository is created if one does not already exist. By way of illustration, the patch installer can create a file system directory contain the patch's components and the patch index. In one embodiment, the directory follows the naming convention "patch_<<version>>" where <<version>> is replaced by the version number of the IDE. The patch components are stored in the repository in step 202. A patch index is created in step 204 if one does not already exist. In step 206, properties for the patch are added to the patch index if they are not already present. Continuing with our example, if the target was an IDE only properties associated with IDE that are to be patched would be modified. The patch identifier and/or patch component identifier(s) are prepended to each property's list for which they are relevant in step 208. In this way, the most recent patch and/or patch component applied to property is the leftmost.

In step 210 the patches for each property are included on the Java® class path. The class path contains an ordered list of files or locations the Java® class loader will use at run-time to locate the classes it needs to execute. A Java® class loader searches this list of locations from left to right as it attempts to locate a needed class. In one embodiment, the patch associated with property are prepended to the list stored in the property, allowing the class loader to find more recent versions of the classes first even though older versions may be referenced on the class path. These older references will be ignored by the class loader.

Figure 3:
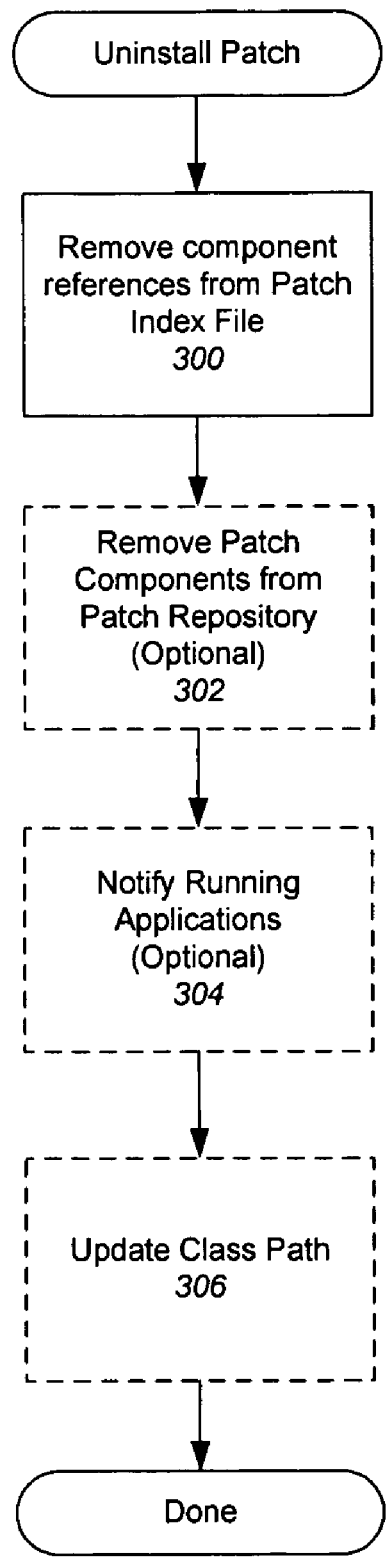
FIG. 3 is a flow chart illustrating a patch de-installation process in accordance to certain embodiments of the invention.

FIG. 3 is a flow chart illustrating patch de-installation in accordance to certain embodiments of the invention. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

In one embodiment, the patch uninstaller 102 can uninstall a patch using the following process. In step 300, references to the patch and its components are removed from the patch index. Optional step 302 removes the patch and its components from the patch repository. Running applications that have registered with the patch manager 100 are optionally notified of the uninstall in step 304. Said notification can be accomplished in a number of ways including, but not limited to, a callback interface, a signal, a message, a flag, and other suitable notification methods. Finally, in step 306 the class path is updated to remove any references to the uninstalled patch.

Various embodiments may be implemented using a conventional general purpose or specialized digital computer(s) and/or processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of conventional component circuits, as will be readily apparent to those skilled in the art.

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of electronic storage media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for dynamically patching a target software application system, comprising:
    storing a patch to a patch repository by a patch installer;
    updating a patch index by the patch installer such that one or more properties in the patch index are associated with the patch, wherein the patch includes one or more components for the target software application system, wherein the one or more properties correspond to one or more pieces of an Integrated Development Environment (IDE); and
    updating a class path by the patch installer at run-time for the target software application system such that the patch associated with each one of the one or more properties supersedes prior patches for the same property,
    wherein a component includes a class, and
    wherein a property includes a list of two or more patch identifiers wherein the list is ordered according to the order in which patches were installed.
2. The method of claim 1 wherein:
    a patch is an archive file.
3. The method of claim 1, further comprising:
    updating a patch index such that the one or more properties in the patch index are no longer associated with the patch; and
    updating a class path at run-time such that the patch for each one of the one or more properties no longer supersedes prior patches for the same property.
4. A method for dynamically patching a target software application system, comprising:
    storing a patch to a patch repository by a patch installer:
    adding a patch by the patch installer to a patch repository wherein the patch includes one or more components for the target software application system;
    updating a patch index by the patch installer such that one or more properties in the patch index are associated with the patch, wherein the one or more properties correspond to one or more pieces of an Integrated Development Environment (IDE); and
    updating a class path by the patch installer at run-time for the target software application system such that the patch associated with each one of the one or more properties supersedes prior patches for the same property; and
    wherein a component includes a class, and
    wherein a property includes a list of two or more patch identifiers wherein the list is ordered according to the order in which patches were installed.
5. The method of claim 4 wherein:
    a patch is an archive file.
6. The method of claim 4, further comprising:
    updating a patch index such that the one or more properties in the patch index are no longer associated with the patch; and
    updating a class path at run-time such that the patch for each one of the one or more properties no longer supersedes prior patches for the same property.
7. A computer-implemented system for dynamically patching a target software system, comprising:
    a memory storing a patch repository capable of storing a patch, wherein the patch includes one or more components for the target software system; a patch index for the patch repository wherein the patch index is capable of being updated such that one or more properties in the patch index are associated with the patch, wherein the one or more properties correspond to one or more pieces of an Integrated Development Environment (IDE); a class path capable of being updated at run-time such that the patch associated with each one of the one or more properties supersedes prior patches for the same property, wherein a component can include a class; and
    a processor executing computer-executable instructions that cause the processor to install the patch by:
    storing the patch to the patch repository;
    updating the patch index such that one or more properties in the patch index are associated with the patch; and
    updating a class path at run-time for the target software system such that the patch associated with each one of the one or more properties supersedes prior patches for the same property,
    wherein a property includes a list of two or more patch identifiers wherein the list is ordered according to the order in which patches were installed.
8. The system of claim 7, further comprising:
    a patch manager to provide access for the target software system to the patch index.
9. The system of claim 7, further comprising:
    a patch manager capable of updating the class path.
10. The system of claim 9 wherein:
    the patch manager can update the patch index such that the one or more properties in the patch index are no longer associated with the patch.
11. The system of claim 9 wherein:
    the target software system updates the class path at run-time such that the patch for each one of the one or more properties no longer supersedes prior patches for the same property.
12. The system of claim 7 wherein:
    a patch is an archive file.
13. A computer-readable electronic storage medium having instructions stored thereon that, when executed by a processor, cause the processor to:

store a patch to a patch repository by a patch installer;

update a patch index by the patch installer such that one or more properties in the patch index are associated with the patch, wherein the patch includes one or more components for a target software system, wherein the one or more properties correspond to one or more pieces of an Integrated Development Environment (IDE); and update a class path by the patch installer at run-time for the target software system such that the patch associated with each one of the one or more properties supersedes prior patches for the same property;

wherein a component includes a class, and wherein a property includes a list of two or more patch identifiers wherein the list is ordered according to the order in which patches were installed.

14. The computer-readable electronic storage medium of claim 13 wherein:

a patch is an archive file.

15. The computer-readable electronic storage medium of claim 13, further comprising instructions to cause the processor to:

update a patch index such that the one or more properties in the patch index are no longer associated with the patch; and update a class path at run-time such that the patch for each one of the one or more properties no longer supersedes prior patches for the same property.

* * * * *

UNITED STATES PATENT AND TRADEMARK OFFICE
CERTIFICATE OF CORRECTION

PATENT NO. : 7,627,866 B2  Page 1 of 1
APPLICATION NO. : 11/012767
DATED : December 1, 2009
INVENTOR(S) : Bunker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 963 days.

Signed and Sealed this

Twenty-first Day of December, 2010

David J. Kappos
*Director of the United States Patent and Trademark Office*